United States Patent
Yoshimura et al.

(10) Patent No.: US 9,309,985 B2
(45) Date of Patent: Apr. 12, 2016

(54) HIGH-FREQUENCY ON-OFF VALVE

(71) Applicant: SMC CORPORATION, Chiyoda-ku (JP)

(72) Inventors: Shinichi Yoshimura, Moriya (JP); Hiromichi Yoshioka, Bando (JP)

(73) Assignee: SMC CORPORATION, Chiyoda-ku (JP)

( * ) Notice: Subject to any disclaimer, the term of this patent is extended or adjusted under 35 U.S.C. 154(b) by 180 days.

(21) Appl. No.: 14/140,794

(22) Filed: Dec. 26, 2013

(65) Prior Publication Data
US 2014/0197341 A1 Jul. 17, 2014

(30) Foreign Application Priority Data
Jan. 17, 2013 (JP) ................. 2013-006631

(51) Int. Cl.
*F16K 21/04* (2006.01)
*F16K 31/06* (2006.01)

(52) U.S. Cl.
CPC ............. *F16K 31/06* (2013.01); *F16K 31/0658* (2013.01)

(58) Field of Classification Search
CPC .. F16K 31/06; F16K 31/0658; F16K 31/0679
USPC .................... 137/516.11; 251/129.09, 129.16
See application file for complete search history.

(56) References Cited

U.S. PATENT DOCUMENTS

| | | | | |
|---|---|---|---|---|
| 1,383,842 A | * | 7/1921 | Ohlsson | 137/516.11 |
| 5,048,564 A | * | 9/1991 | Gaiardo | 137/599.07 |
| 5,996,610 A | * | 12/1999 | Sato et al. | 137/271 |
| 6,866,012 B2 | * | 3/2005 | Hayase et al. | 123/90.11 |
| 7,032,879 B2 | * | 4/2006 | Hayashi | 251/129.09 |
| 7,290,564 B2 | * | 11/2007 | Takahashi et al. | 137/625.25 |

(Continued)

FOREIGN PATENT DOCUMENTS

| | | | |
|---|---|---|---|
| JP | 2-36675 U | | 3/1990 |
| JP | 2-036678 | * | 3/1990 |
| JP | 2-36678 U | | 3/1990 |

(Continued)

OTHER PUBLICATIONS

Presentation of publications and the like issued Dec. 15, 2014 in Japanese Patent Application No. 2013-006631 (with English language translation).

(Continued)

*Primary Examiner* — Marina Tietjen
*Assistant Examiner* — Seth W Mackay-Smith
(74) *Attorney, Agent, or Firm* — Oblon, McClelland, Maier & Neustadt, L.L.P.

(57) ABSTRACT

A high-frequency on-off valve includes a valve chamber communicating with an input flow path, output orifices opening into the valve chamber, a plate-shaped valve member disposed within the valve chamber such that the valve member is movable into and out of contact with output valve seats surrounding the output orifices, and an electromagnetic operating section that opens and closes the valve member. The high-frequency on-off valve opens and closes the plurality of output orifices by bringing the valve member into and out of contact with the output valve seats by utilizing an effect of an electromagnetic attraction force produced by the electromagnetic operating section and an effect of fluid pressure within the valve chamber. The valve has the plurality of output orifices that are long-hole-shaped.

9 Claims, 7 Drawing Sheets

(56) References Cited

U.S. PATENT DOCUMENTS

| | | | |
|---|---|---|---|
| 7,520,488 B2 * | 4/2009 | Yoshimura | 251/129.16 |
| 2004/0222397 A1 | 11/2004 | Hayashi | |

FOREIGN PATENT DOCUMENTS

| | | | |
|---|---|---|---|
| JP | 10-122409 A | 5/1998 |
| JP | 11-132352 A | 5/1999 |
| JP | 11-304034 A | 11/1999 |
| JP | 2000-46223 A | 2/2000 |
| JP | 2004-332876 | 11/2004 |
| JP | 2004-332876 A | 11/2004 |
| JP | 2006-329335 | 12/2006 |
| JP | 2006-329335 A | 12/2006 |

OTHER PUBLICATIONS

Office Action issued Mar. 24, 2015 in Japanese Patent Application No. 2013-006631 (with English language translation).

Office Action issued Feb. 24, 2015 in Korean Patent Application No. 10-2014-0004976 (with English language translation).

* cited by examiner

HIGH-FREQUENCY ON-OFF VALVE

BACKGROUND OF THE INVENTION

[1] Field of the Invention

The present invention relates to high-frequency on-off valves that frequently open and close output orifices by bringing valve members, which have a small opening-closing stroke, into and out of contact with valve seats.

[2] Description of the Related Art

Patent Literatures, Japanese Unexamined Patent Application Publication No. 2004-332876 and Japanese Unexamined Patent Application Publication No. 2006-329335, for example, each disclose a known high-frequency on-off valve of the aforementioned type. A high-frequency on-off valve is used for, for example, sorting articles and is configured to open and close an output orifice by bringing a plate-shaped valve member into and out of contact with a valve seat so as to output a pressure fluid from the output orifice toward an article to be sorted at high speed. However, since the opening-closing stroke of the valve member is small (e.g., about 0.1 mm), it is difficult to obtain a good balance between the responsiveness of the valve member and the flow rate characteristics of the output fluid. If the opening-closing stroke of the valve member is to be reduced for enhancing the responsiveness, the opening amount of the output orifice decreases, resulting in poor flow rate characteristics. In contrast, increasing the opening-closing stroke of the valve member for enhancing the flow rate characteristics results in poor responsiveness. Furthermore, increasing the opening area of the output orifice itself hardly contributes to an improvement in flow rate characteristics since the flow rate of the output fluid depends on the opening amount of the output orifice by the valve member, that is, the area of a gap (i.e., a valve opening) formed between the valve member and the valve seat.

The high-frequency on-off valve of this type is also commonly used under conditions that require an output fluid with a high flow rate. Therefore, a new high-frequency on-off valve that can obtain an output fluid with a flow rate higher than that in the high-frequency on-off valve in the related art is desired.

DISCLOSURE OF INVENTION

A technical object of the present invention is to provide a high-frequency on-off valve that achieves improved flow rate characteristics without deteriorating the responsiveness of a valve member, as compared with the high-frequency on-off valve in the related art.

In order to achieve the aforementioned object, the present invention provides a high-frequency on-off valve including an electromagnetic operating section that has an exciting coil wound around a bobbin and a stationary core attached within a center hole of the bobbin; a main valve section that is connected to the electromagnetic operating section via a valve chamber and has a plurality of long-hole-shaped output orifices parallel-arranged within the valve chamber, output valve seats surrounding the respective output orifices, an input flow path surrounding the output valve seats and communicating with the valve chamber, an output port communicating with the output orifices, and an input port communicating with the input flow path; and a plate-shaped valve member that is disposed within the valve chamber such that the valve member is movable into and out of contact with the output valve seats. When electricity is applied to the exciting coil, the valve member is attracted toward the stationary core and moves away from the output valve seats so as to be set at a first position at which the valve member makes the output orifices and the input flow path communicate with each other. When the electricity is cut off, the valve member is pressed onto the output valve seats due to an effect of a pressure fluid so as to be set at a second position at which the valve member closes the output orifices and blocks the output orifices from the input flow path.

In the present invention, the valve chamber preferably has a longitudinal direction and a lateral direction. Moreover, it is preferable that the output orifices extend slenderly in the longitudinal direction of the valve chamber and be parallel-arranged in the lateral direction of the valve chamber.

In the present invention, a plurality of orifice arrays each formed of a plurality of output orifices parallel-arranged in the lateral direction of the valve chamber may be provided, and the plurality of orifice arrays may be arranged next to each other in the longitudinal direction of the valve chamber.

In the present invention, it is desirable that each output orifice extend linearly and that the parallel-arranged output orifices extend parallel to each other.

In this case, it is preferable that the input flow path continuously surround an entire perimeter of the output valve seat of each output orifice. Moreover, it is preferable that a flow-path segment interposed between the output valve seats of the parallel-arranged output orifices extend linearly. The flow-path segment preferably has a flow-path width that is uniform along an entire length of the flow-path segment and that is larger than an opening width of each output orifice.

Furthermore, in the present invention, in the case where the plurality of orifice arrays are provided, it is preferable that, in the plurality of orifice arrays, output orifices that are next to each other in the longitudinal direction of the valve chamber be disposed in alignment with each other.

Furthermore, in the present invention, the output orifices may each have a shape of an arch, and the parallel-arranged output orifices may face each other with a distance therebetween that is smaller than a radius of curvature of the arch.

According to the present invention, with the plurality of long-hole-shaped parallel-arranged output orifices, the flow rate of the output fluid can be increased without having to increase the opening-closing stroke of the valve member, whereby the flow rate characteristics can be improved without deteriorating the responsiveness, as compared with a valve in the related art.

DETAILED DESCRIPTION OF THE INVENTION

Figure 1:
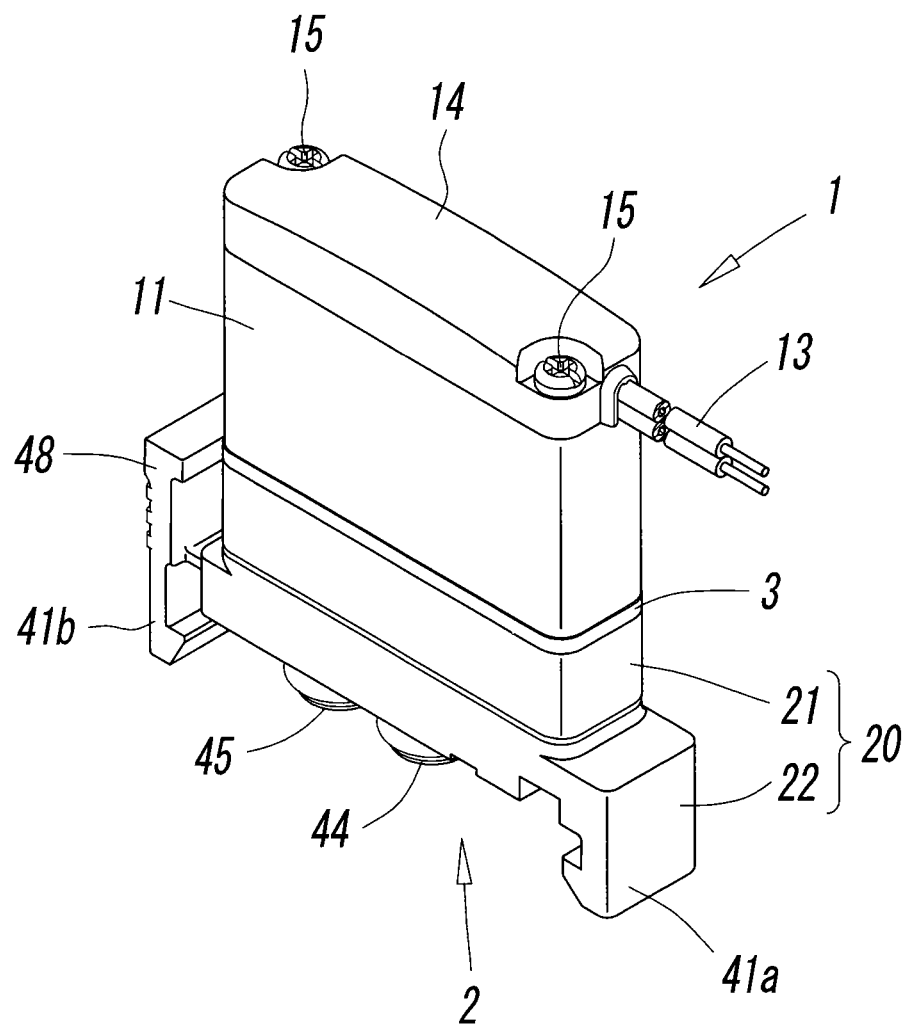
FIG. 1 is a perspective view of a high-frequency on-off valve according to a first embodiment of the present invention.

FIGS. 1 to 6 illustrate a high-frequency on-off valve according to a first embodiment of the present invention. This valve has a valve structure serving as a poppet-type two-port electromagnetic valve, and includes an electromagnetic operating section 1 and a main valve section 2 that are connected to each other via a spacer 3, a valve chamber 4 formed between the electromagnetic operating section 1 and the main valve section 2, and a valve member 5 accommodated within the valve chamber 4. In plan view, the valve has a slender rectangular shape having a longitudinal direction and a lateral direction. Therefore, in plan view, the valve chamber 4 similarly has a slender rectangular shape having a longitudinal direction and a lateral direction.

Figure 2:
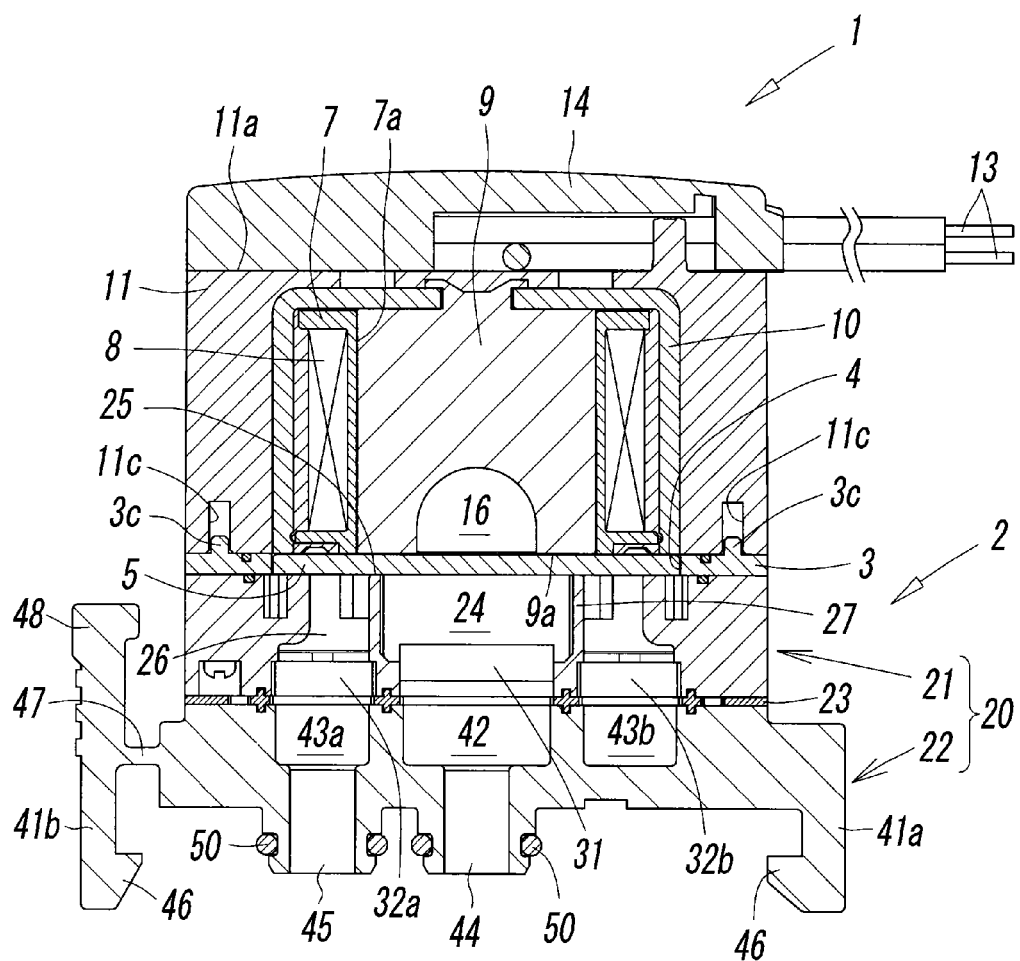
FIG. 2 is an enlarged vertical sectional view of FIG. 1.
Figure 3:
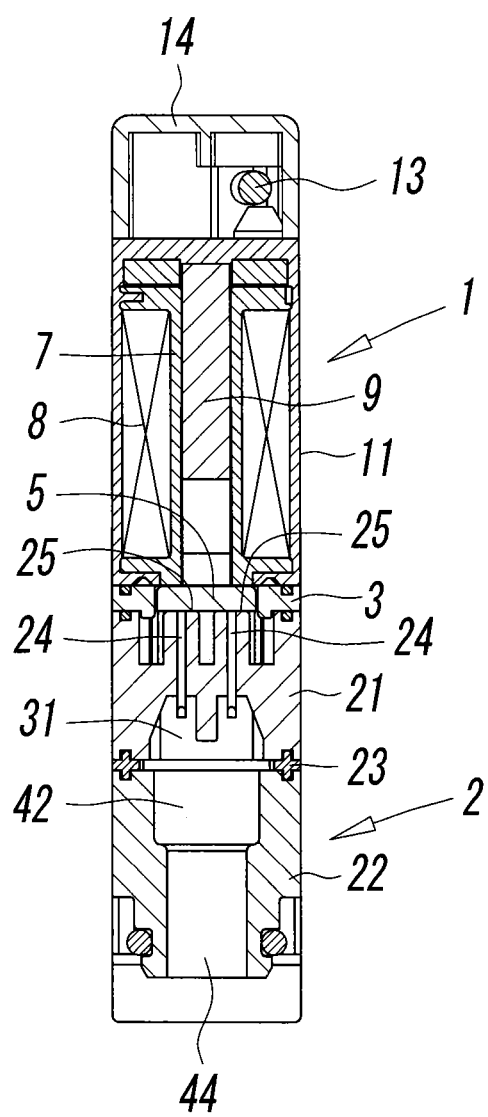
FIG. 3 is a vertical sectional view taken along a center line in FIG. 2.

As shown in FIGS. 2 and 3, the electromagnetic operating section 1 includes a nonmagnetic bobbin 7 having a substantially rectangular cross-sectional shape extending slenderly in the longitudinal direction of the valve, an exciting coil 8 wound around the bobbin 7, a stationary core 9 having a substantially slender rectangular cross-sectional shape and accommodated within a center hole 7a of the bobbin 7, and a substantially U-shaped magnetic frame 10 that covers the upper surface and opposite side surfaces, in the longitudinal direction, of the bobbin 7. The bobbin 7, the exciting coil 8, the stationary core 9, and the magnetic frame 10 constitute an electromagnetic valve assembly. The upper surface and side surfaces of this electromagnetic valve assembly are entirely coated with a sealing member 11 composed of synthetic resin. The sealing member 11 has a flat upper surface 11a from which a pair of coil terminals 12 that conduct electricity to the exciting coil 8 protrude. The coil terminals 12 are connected to lead wires 13. A cover 14 is disposed on the upper surface 11a of the sealing member 11 so as to cover the connection area between the coil terminals 12 and the lead wires 13. The cover 14 is attached to the sealing member 11 by means of screws 15. Reference numeral 14a in FIG. 4 denotes screw through-holes formed in the cover 14, and reference numeral 11b denotes screw holes formed in the sealing member 11.

An end surface, that is, a lower end surface, of the stationary core 9 serves as a pole face 9a to which the valve member 5 is attached. A central area of the pole face 9a in the longitudinal direction thereof is provided with a fluid introduction chamber 16 formed by cutting out a portion of the stationary core 9 into a U-shape. In a state where the valve member 5 is attached to the pole face 9a by applying electricity to the exciting coil 8, when the electricity is cut off, the fluid introduction chamber 16 accelerates separation of the valve member 5 from the pole face 9a by utilizing an effect of a pressure fluid, such as air, introduced into the fluid introduction chamber 16.

A valve body 20 of the main valve section 2 includes a first upper body 21 and a second lower body 22 that are joined to each other via a gasket 23.

As shown in FIGS. 2 to 6, the first body 21 has a substantially rectangular shape in plan view that extends slenderly in the longitudinal direction of the valve. The first body 21 includes a plurality of (two in the example shown in the drawings) long-hole-shaped output orifices 24 parallel-arranged within the valve chamber 4, output valve seats 25 surrounding the respective output orifices 24, and an input flow path 26 that communicates with the valve chamber 4 in a state where the input flow path 26 continuously surrounds the entire perimeter of each output valve seat 25.

The output orifices 24 extend linearly and are formed within slender hollow walls 27 standing upright from the bottom of the first body 21. Moreover, the output orifices 24 extend slenderly in the longitudinal direction of the first body 21 (i.e., the longitudinal direction of the valve chamber 4). The output valve seats 25 are formed along the upper edges of the hollow walls 27. The plurality of hollow walls 27, that is, the output orifices 24, are disposed next to each other in a parallel arrangement in the lateral direction of the first body 21 (i.e., the lateral direction of the valve chamber 4), are symmetrically arranged with respect to the center of the valve chamber 4 in the lateral direction thereof, and extend parallel to each other. Each hollow wall 27 is surrounded by a space that forms the input flow path 26.

The multiple output orifices 24 have the same configuration and have the same opening width a and the same length b. A valve-seat width c of each output valve seat 25 is uniform along the entire perimeter thereof.

A flow-path segment 26a, which is interposed between the two adjoining output valve seats 25 and 25, of the input flow path 26 extends linearly and has a flow-path width d that is uniform along the entire length of the flow-path segment 26a. The flow-path width d of the flow-path segment 26a is larger than the opening width a of each output orifice 24. A flow-path segment 26b located between each output valve seat 25 and a chamber wall of the valve chamber 4 in the lateral direction thereof is similar to the flow-path segment 26a in that it extends linearly and has a flow-path width e that is uniform along the entire length thereof. The flow-path width e is larger than the opening width a of each output orifice 24.

As shown in FIGS. 2 and 3, the two output orifices 24 communicate with a single first output connection port 31, which is provided at the center of the bottom surface of the first body 21, via holes within the hollow walls 27. The input flow path 26 communicates with two first input connection ports 32a and 32b that are arranged with the first output connection port 31 interposed therebetween at the bottom surface of the first body 21.

The first body 21 is fixed to the lower surface of the electromagnetic operating section 1 via the spacer 3 by using two first screws 34. The valve chamber 4 is formed by a slender-rectangular-shaped inner hole 3a formed in the spacer 3.

Figure 4:
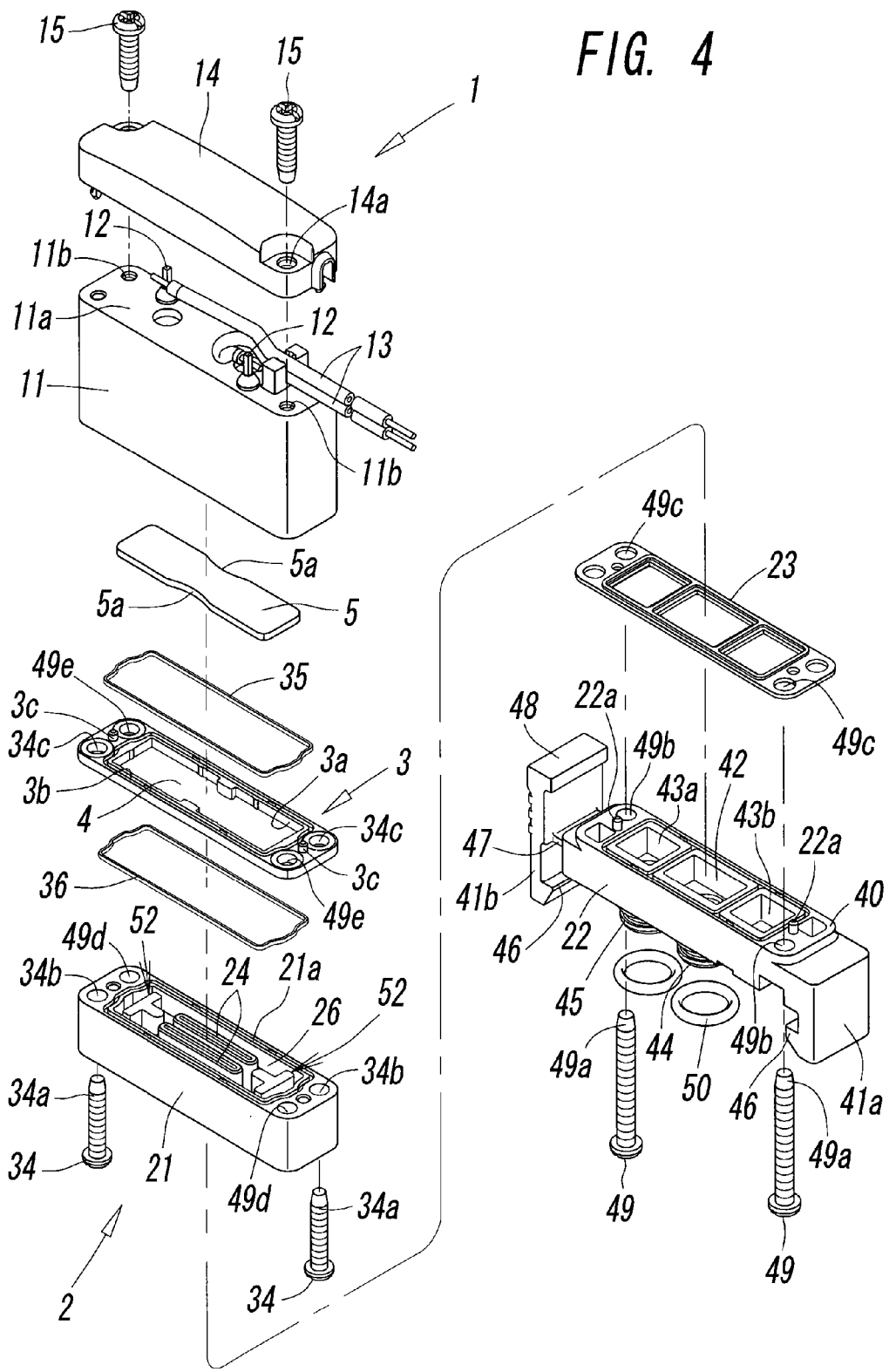
FIG. 4 is a perspective view of the valve in FIG. 1 in a disassembled state.

As shown in FIG. 4, the first screws 34 extend through two screw through-holes 34b formed at diagonal corners of the first body 21 and two screw through-holes 34c formed at diagonal corners of the spacer 3, and male screw sections 34a provided at the ends of the first screws 34 are screwed into screw holes (not shown) formed in the sealing member 11.

A substantially-rectangular-frame-shaped seal member 35 is interposed between the sealing member 11 and the spacer 3, and a substantially-rectangular-frame-shaped seal member 36 is interposed between the spacer 3 and the first body 21. The seal member 35 is fitted to an attachment groove 3b formed in the upper surface of the spacer 3 so as to surround the inner hole 3a. The seal member 36 is fitted to an attachment groove 21a formed in the upper surface of the first body 21 so as to surround the input flow path 26.

Reference numeral 3c in FIGS. 2 and 4 denotes positioning protrusions formed at the upper surface of the spacer 3. By fitting these positioning protrusions 3c into positioning holes 11c formed at the lower surface of the sealing member 11, the spacer 3 is set in position.

As shown in FIGS. 2 to 4, the second body 22 includes a base 40 having substantially the same shape and size as the first body 21 in plan view, and two attachment leg sections 41a and 41b formed at opposite sides of the base 40 in the longitudinal direction thereof.

The upper surface of the base 40 is provided with a second output connection port 42 that communicates with the first output connection port 31 of the first body 21, and two second input connection ports 43a and 43b that individually communicate with the first input connection ports 32a and 32b of the first body 21. The lower surface of the base 40 is provided with an output port 44 that communicates with the second output connection port 42 and an input port 45 that communicates with the second input connection port 43a. The other second input connection port 43b extends to an intermediate depth of the base 40 and does not open at the lower surface of the base 40. Reference numeral 50 in the drawing denotes O-rings.

The two attachment leg sections 41a and 41b are provided for attaching the valve to a fluid supply member, such as a manifold base. The valve is fixed by sandwiching the fluid supply member between the two leg sections 41a and 41b. Therefore, locking protrusions 46 to be locked onto, for example, locking recesses in the fluid supply member protrude toward each other from the ends (i.e., lower ends) of the leg sections 41a and 41b. The first leg section 41a is fixedly connected to the second body 22, whereas the second leg section 41b is elastically connected to the second body 22 in an openable-closable manner via an elastic connection section 47. The second leg section 41b is provided with an operable section 48 for an opening-closing operation.

The second body 22 is joined to the lower surface of the first body 21 via the gasket 23 and is fixed to the electromagnetic operating section 1 by means of two second screws 49. The second screws 49 extend through two screw throughholes 49b formed at diagonal corners of the second body 22, two screw through-holes 49c formed at diagonal corners of the gasket 23, two screw through-holes 49d formed at diagonal corners of the first body 21, and two screw through-holes 49e formed at diagonal corners of the spacer 3, and male screw sections 49a provided at the ends of the second screws 49 are screwed into screw holes (not shown) formed in the sealing member 11 of the electromagnetic operating section 1.

Reference numeral 22a in FIG. 4 denotes positioning protrusions formed at the upper surface of the second body 22. By fitting these positioning protrusions 22a into positioning holes (not shown) formed at the lower surface of the first body 21 via the gasket 23, the first body 21 and the second body 22 are connected to each other in a state where they are positioned relative to each other.

The valve member 5 is a substantially rectangular plate composed of a magnetic material, such as iron, and extending slenderly in the longitudinal direction of the valve chamber 4. The valve member 5 has a substantially uniform thickness in its entirety and is disposed within the valve chamber 4 such that the valve member 5 is movable into and out of contact with the output valve seats 25 in a state where a slight gap through which a pressure fluid can flow is maintained between the outer periphery of the valve member 5 and the inner periphery of the chamber wall of the valve chamber 4. When electricity is applied to the exciting coil 8, the valve member 5 becomes attached to the stationary core 9 so as to be positioned away from the output valve seats 25. Thus, the valve member 5 is set at a first position (not shown) where it makes the output orifices 24 and the input flow path 26 communicate with each other. When the electricity is cut off, the valve member 5 moves away from the stationary core 9 and becomes pressed onto the output valve seats 25 due to the effect of the pressure fluid flowing to the upper surface of the valve member 5 via the aforementioned gap. Thus, the valve member 5 is set at a second position (i.e., a position shown in FIGS. 2 and 3) where it closes the output orifices 24 so as to block the output orifices 24 from the input flow path 26. In this case, the opening-closing stroke of the valve member 5 is about 0.1 mm.

An intermediate section of the valve member 5 in the longitudinal direction thereof is slightly wasted due to recessed cutouts 5a formed at opposite side surfaces thereof. The area of the gap that surrounds the outer periphery of the valve member 5 is increased at the cutouts 5a, so that the pressure fluid can readily flow toward the upper surface of the valve member 5 and into the fluid introduction chamber 16 of the stationary core 9.

With regard to the surfaces of the valve member 5, at least the lower surface thereof that comes into and out of contact with the output valve seats 25 is preferably coated with, for example, nickel or chromium.

Furthermore, in order to stabilize the orientation of the valve member 5 by bringing it into contact with the two output valve seats 25 in a parallel position, opposite longitudinal positions of the hollow walls 27 within the first body 21 are provided with support sections 52 that are T-shaped in plan view. Opposite longitudinal ends of the valve member 5 are supported from below by the upper surfaces of the support sections 52. Each support section 52 has a first portion 52a extending slenderly in the lateral direction of the valve chamber 4 and a second portion 52b extending slenderly in the longitudinal direction of the valve chamber 4. The second portion 52b is positioned closer to the output valve seats 25 than the first portion 52a. The height of the support sections 52 measured from the bottom of the first body 21 is the same as the height of the output valve seats 25.

Next, the operation of the high-frequency on-off valve having the above-described configuration will be described. FIGS. 2 and 3 illustrate a state where electricity is not applied to the exciting coil 8 in the electromagnetic operating section 1, and the valve member 5 is set at the second position where it is in contact with the two output valve seats 25 so as to close the two output orifices 24.

When electricity is applied to the exciting coil 8 from this state, the valve member 5 becomes attracted toward the pole face 9a of the stationary core 9 due to a magnetic force generated in the stationary core 9, whereby the valve member 5 moves away from the output valve seats 25 toward the first position where the valve member 5 opens the output orifices 24. Therefore, the pressure fluid from the input flow path 26 flows into the two output orifices 24 through the gap (i.e., a valve opening) formed between the valve member 5 and the output valve seats 25, and is output to the outside (i.e., atmosphere) from the output port 44 via a discharge nozzle (not shown).

In this case, since the output valve seats 25 of the two output orifices 24 are continuously surrounded by the input flow path 26 and the flow-path width d of the flow-path segment 26a intervening the two output valve seats 25 is larger than the opening width a of each output orifice 24, the pressure fluid within the input flow path 26 flows uniformly and smoothly into each output orifice 24 from the entire perimeter of each output valve seat 25 via the valve opening without being throttled by the flow-path segment 26a, and the combined flow rate of the pressure fluid flowing into the two output orifices 24 is output from the output port 44. Therefore, the flow rate of the output pressure fluid is twice as large as that in a case where only a single output orifice is provided as in a known valve. In addition, since the valve member 5 does not need to have a large opening stroke, deterioration in responsiveness is prevented.

Furthermore, with regard to the area of the gap, that is, the valve opening, formed between the valve member and each output valve seat, the total area of the valve openings of the two output orifices 24 and 24 is larger than that of a single output orifice with a wide opening width and having an opening area equivalent to the total opening area of the two output orifices 24 and 24. Therefore, the flow rate of the output fluid is naturally larger in the case where two output orifices 24 and 24 are provided.

When the electricity applied to the exciting coil 8 is cut off, the valve member 5 is pressed onto the output valve seats 25 due to fluid pressure acting on the upper surface of the valve member 5, thereby closing the output orifices 24 and blocking the communication between the output orifices 24 and the input flow path 26. Thus, the output of pressure fluid from the output port 44 is stopped.

In the aforementioned valve, the opening-closing operation of the valve member 5 is frequently repeated.

Although there are two parallel-arranged output orifices 24 in the first embodiment, the number of output orifices 24 may be three or more.

Figure 7:
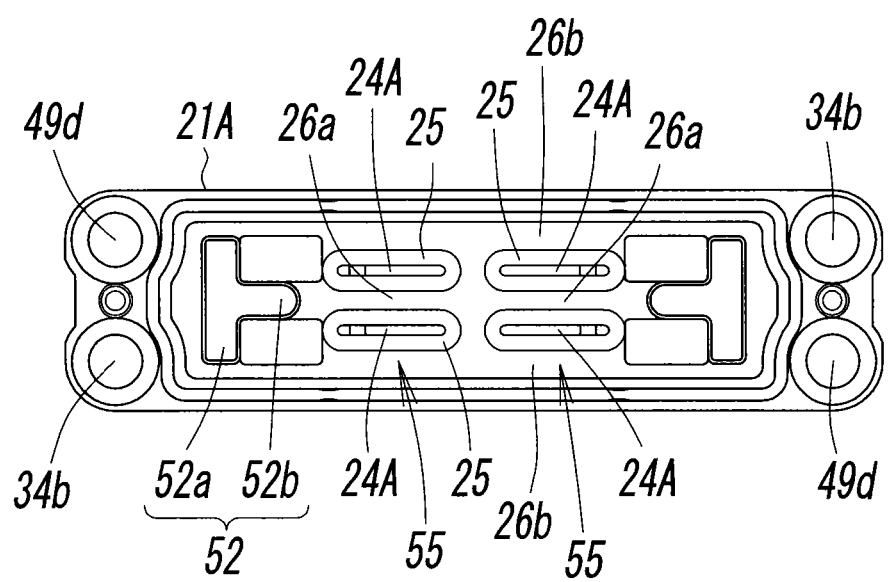
FIG. 7 is a plan view of a first body according to a second embodiment of the present invention.

FIG. 7 illustrates a second embodiment of the present invention. Specifically, a plurality of orifice arrays 55 each formed by parallel-arranging a plurality of output orifices 24A in the lateral direction of the valve chamber 4, that is, a first body 21A, are provided. The plurality of orifice arrays 55 are spaced apart from each other in the longitudinal direction of the first body 21A.

In the example shown in the drawing, two orifice arrays 55 are formed, and each orifice array 55 includes two output orifices 24A.

The output orifices 24A extend linearly and have the same configuration. The output orifices 24A in each orifice array 55 extend parallel to each other. The corresponding output orifices 24A in the adjoining orifice arrays 55 are disposed in alignment with each other.

Figure 5:
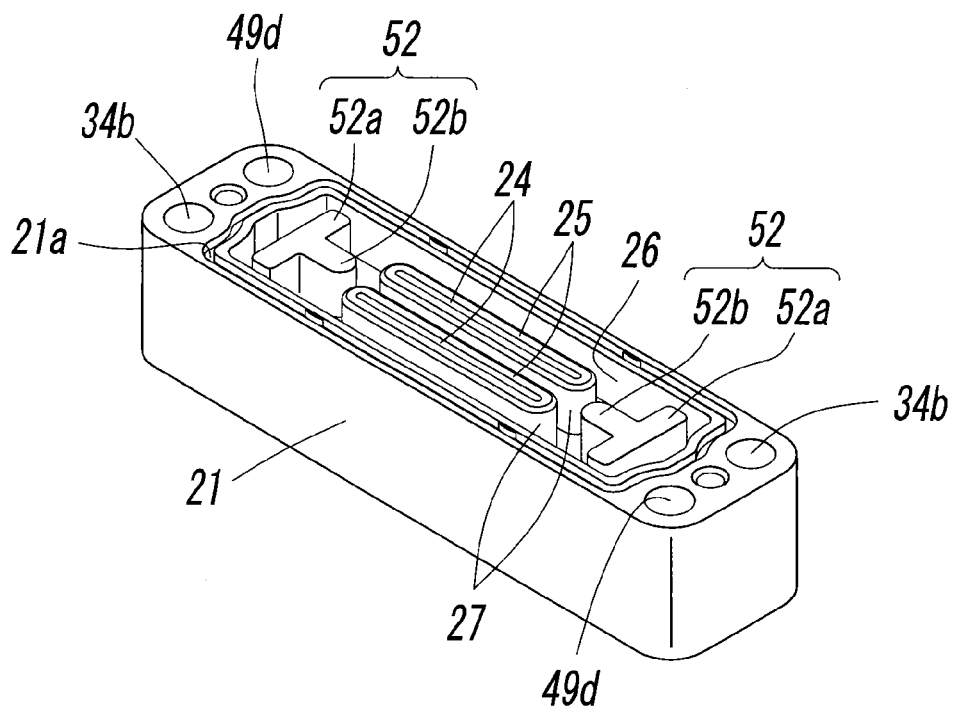
FIG. 5 is a perspective view of a first body constituting a part of a valve body of a main valve section.
Figure 6:
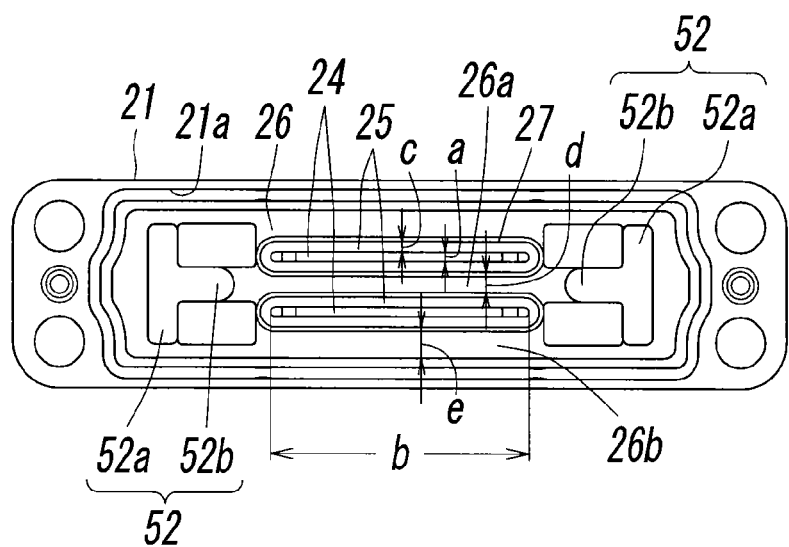
FIG. 6 is a plan view of FIG. 5.

Since other configurations in the second embodiment are substantially the same as those of the first body 21 in the first embodiment shown in FIGS. 5 and 6, main components that are the same as those in the first body 21 are given the same reference numerals as those used in the first body 21, and descriptions thereof will be omitted.

In the second embodiment, the number of orifice arrays 55 may be three or more, and the number of output orifices 24A belonging to each orifice array 55 may be three or more. However, the number of output orifices 24A belonging to the respective orifice arrays 55 does not necessarily need to be the same, and the output orifices 24A in the adjoining orifice arrays 55 do not necessarily need to be disposed in alignment with each other.

Figure 8:
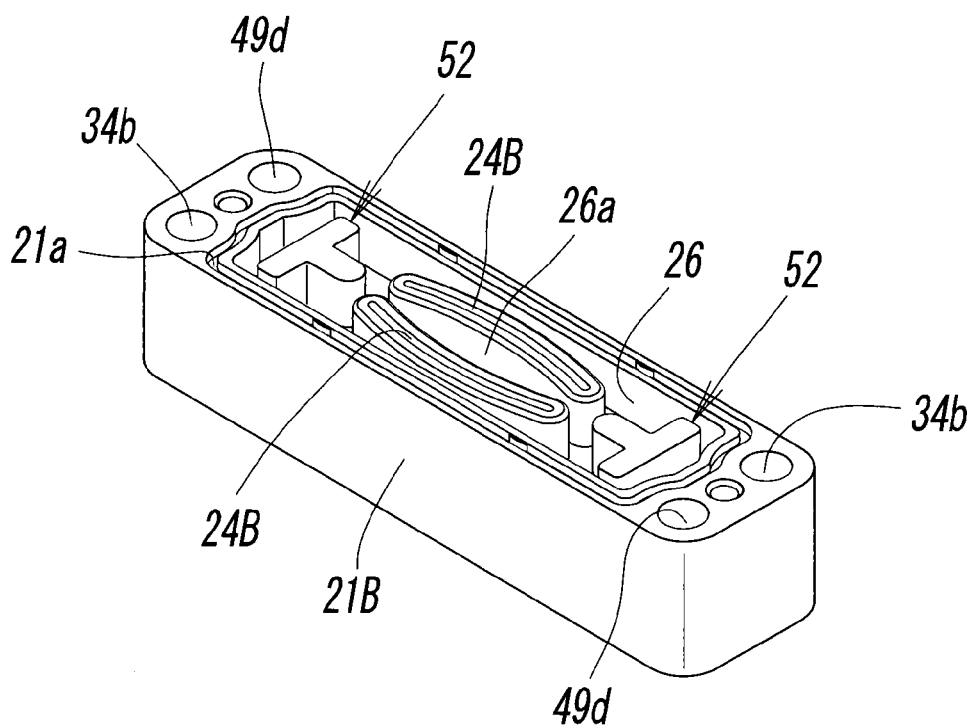
FIG. 8 is a perspective view of a first body according to a third embodiment of the present invention.
Figure 9:
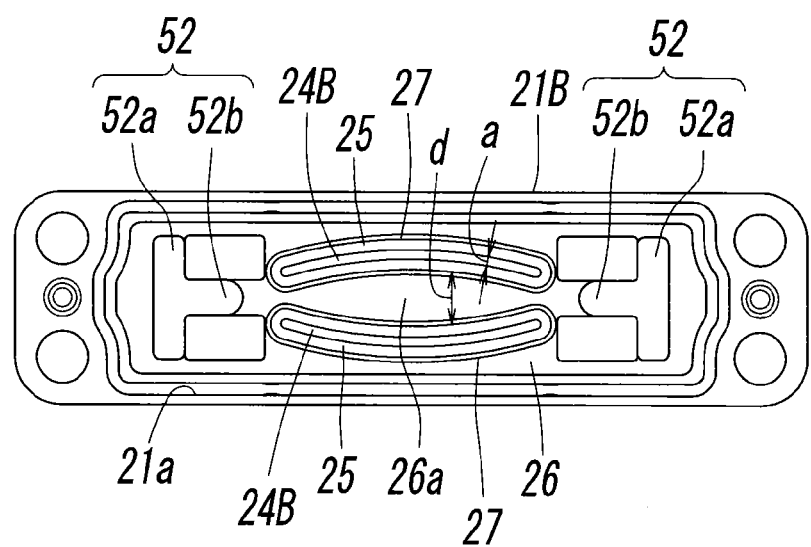
FIG. 9 is a plan view of FIG. 8.

FIGS. 8 and 9 illustrate a third embodiment of the present invention. Specifically, a first body 21B in the valve body 20 of the main valve section 2 has two arch-shaped output orifices 24B that are disposed facing each other.

The two output orifices 24B have the same radius of curvature and face each other with a distance therebetween that is smaller than the aforementioned radius of curvature. The center of curvature of one output orifice 24B is located at a position different from that of the center of curvature of the other output orifice 24B. In other words, the two output orifices 24B are not positioned along the circumference of a single circle. More specifically, the two output orifices 24B extend slenderly in the longitudinal direction of the first body 21B and are parallel-arranged in the lateral direction of the first body 21B. Moreover, the two output orifices 24B are convex-curved outward in the lateral direction of the first body 21B and face away from each other such that the distance between the output orifices 24B is at a maximum at intermediate sections thereof in the longitudinal direction. Therefore, although the flow-path width d of the flow-path segment 26a of the input flow path 26 intervening the two output orifices 24B and 24B is the smallest at the opposite longitudinal ends of the flow-path segment 26a and is the largest at the intermediate section thereof, the flow-path width d at the opposite ends with the smallest width is still larger than the opening width a of each output orifice 24B.

Since configurations other than the output orifices 24B in the first body 21B are substantially the same as those of the first body 21 shown in FIGS. 5 and 6, components that are the same as those in the first body 21 are given the same reference numerals as those used in the first body 21, and descriptions thereof will be omitted.

In the third embodiment, a plurality of orifice arrays each formed of two output orifices 24B may be provided, and the plurality of orifice arrays may be arranged next to each other in the longitudinal direction of the first body 21B, as in the second embodiment shown in FIG. 7.

In each of the above embodiments, the output orifices 24, 24A, or 24B extend slenderly in the longitudinal direction of the first body 21, 21A, or 21B and are parallel-arranged in the lateral direction of the first body 21, 21A, or 21B. Alternatively, the output orifices 24, 24A, or 24B may extend slenderly in the lateral direction of the first body 21, 21A, or 21B, and the plurality of output orifices 24, 24A, or 24B may be parallel-arranged in the longitudinal direction of the first body 21, 21A, or 21B.

The invention claimed is:

1. A high-frequency on-off valve comprising:
    an electromagnetic operating section that has an exciting coil wound around a bobbin and a stationary core attached with a center hole of the bobbin;
    a main valve section that is connected to the electromagnetic operating section via a valve chamber and has a plurality of long-hole-shaped output orifices parallel-arranged within the valve chamber, output valve seats surrounding the respective output orifices, an input flow path surrounding the output valve seats and communicating with the valve chamber, an output port communicating with the output orifices, and an input port communicating with the input flow path; and
    a plate-shaped valve member that is disposed within the valve chamber such that the valve member is movable into and out of contact with the output valve seats, wherein when electricity is applied to the exciting coil, the valve member is attracted toward the stationary core and moves away from the output valve seats so as to be set at a first position at which the valve member makes the output orifices and the input flow path communicate with each other, and wherein when the electricity is cut off, the valve member is pressed onto the output valve seats due to an effect of a pressure fluid so as to be set at a second position at which the valve member closes the output orifices and blocks the output orifices from the input flow path,
    wherein the valve chamber has a longitudinal direction and a lateral direction, and wherein the output orifices extend slenderly in the longitudinal direction of the valve chamber and are adjacently arranged in the lateral direction of the valve chamber.

2. The high-frequency on-off valve according to claim 1, wherein each output orifice extends linearly, and wherein the output orifices arranged adjacently in the lateral direction of the valve chamber extend parallel to each other.

3. The high-frequency on-off valve according to claim 2, wherein the input flow path continuously surrounds an entire perimeter of the output valve seat of each output orifice, wherein a flow-path segment interposed between the output valve seats of the output orifices arranged adjacently in the lateral direction of the valve chamber extends linearly, and wherein the flow-path segment has a flow-path width that is uniform along an entire length of the flow-path segment and that is larger than an opening width of each output orifice.

4. The high-frequency on-off valve according to claim 1, wherein a plurality of orifice arrays each formed of a plurality of output orifices arranged adjacently in the lateral direction of the valve chamber are provided, and wherein the plurality of orifice arrays are arranged next to each other in the longitudinal direction of the valve chamber.

5. The high-frequency on-off valve according to claim 4, wherein each output orifice extends linearly, and wherein the output orifices arranged adjacently in the lateral direction of the valve chamber extend parallel to each other.

6. The high-frequency on-off valve according to claim 5, wherein, in the plurality of orifice arrays, the output orifices that are next to each other in the longitudinal direction of the valve chamber are disposed in alignment with each other.

7. The high-frequency on-off valve according to claim 5, wherein the input flow path continuously surrounds an entire perimeter of the output valve seat of each output orifice, wherein a flow-path segment interposed between the output valve seats of the output orifices arranged adjacently in the lateral direction of the valve chamber extends linearly, and wherein the flow-path segment has a flow-path width that is uniform along an entire length of the flow-path segment and that is larger than an opening width of each output orifice.

8. The high-frequency on-off valve according to claim 4, wherein the output orifices each have a shape of an arch, and wherein the output orifices arranged adjacently in the lateral direction of the valve chamber face each other with a distance therebetween that is smaller than a radius of curvature of the arch.

9. The high-frequency on-off valve according to claim 1, wherein the output orifices each have a shape of an arch, and wherein the output orifices arranged adjacently in the lateral direction of the valve chamber face each other with a distance therebetween that is smaller than a radius of curvature of the arch.

* * * * *